March 30, 1971 R. E. BURK 3,572,997
SOIL TESTING KIT
Filed May 24, 1968
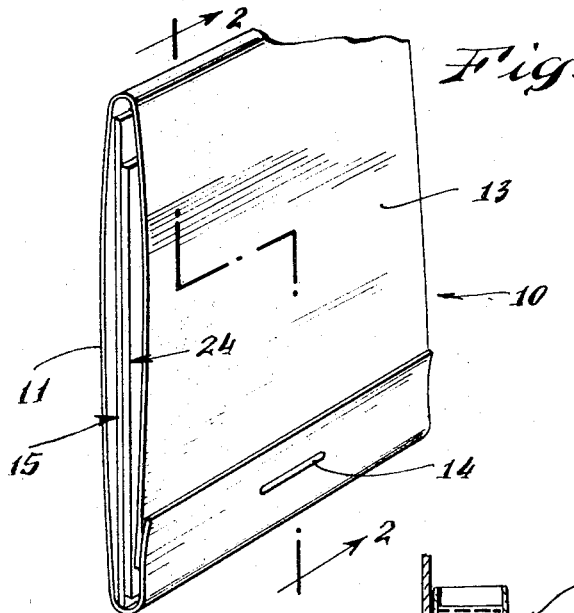
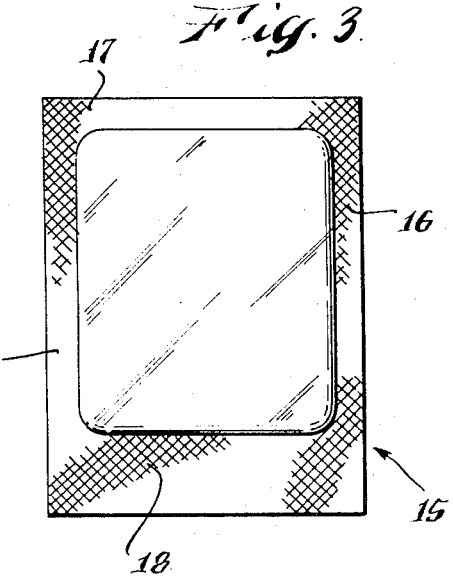
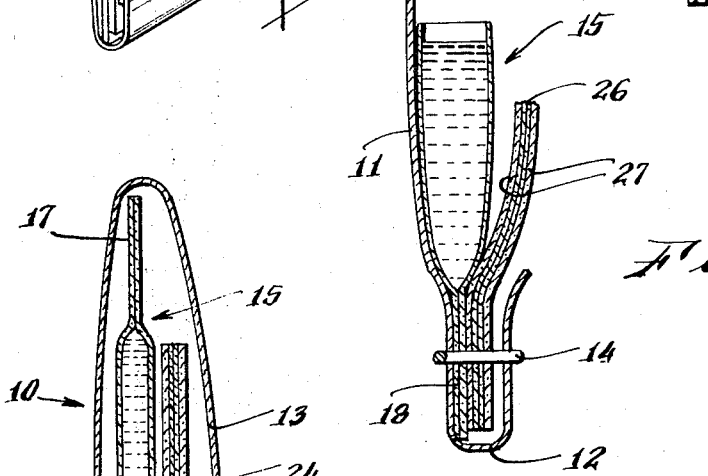
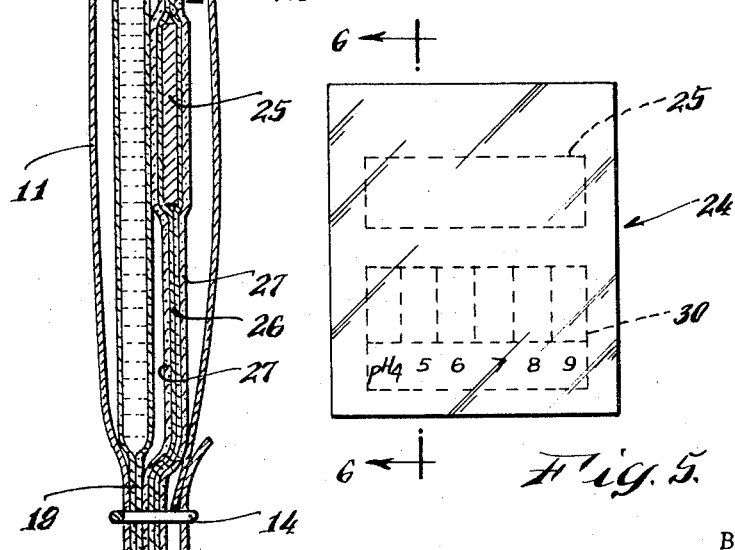
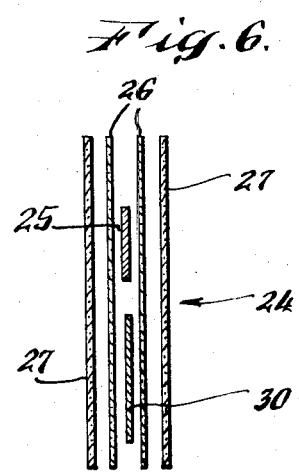
INVENTOR.
Robert E. Burk
BY
Mattern, Ware & Davis
ATTORNEYS

United States Patent Office 3,572,997
Patented Mar. 30, 1971

3,572,997
SOIL TESTING KIT
Robert E. Burk, Milford, Conn., assignor to Burk
Industries, Inc., Milford, Conn.
Filed May 24, 1968, Ser. No. 731,770
Int. Cl. G01n 33/24, 31/22; B65d 79/00
U.S. Cl. 23—253                                    6 Claims

ABSTRACT OF THE DISCLOSURE

A soil testing kit in which an envelope containing water together with an envelope containing a test paper are packaged in the bottom fold of a matchbook type package. The water-containing envelope is stiffened through heat sealing so that it may be supported vertically to act as a mixing container.

---

This invention relates to a soil testing kit of extreme simplicity, and, therefore, one that may be manufactured at extremely low cost. The purpose of the kit is to facilitate the determination of the pH factor or degree of acidity and alkalinity of soil. Obviously, a kit of this type must be sold at a low price, and if the cost is sufficiently low, it may be used as a premium item. Despite its low cost, the kit must be easy to use, must be accurate in its results, and durable. A truly successful kit will have considerable commercial value.

Many attempts have been made to develop soil testing kits of the class described, but so far as I know, none have been successful. As those skilled in the art will appreciate, a soil testing kit must include as one element, a volume of distilled water. The packaging of distilled water in an economical manner, itself presents a considerable problem. However, coupled with this problem, is the further problem that the water container of the soil testing kit must be adapted for the insertion therein of soil which is to be mixed with the distilled water so that the distilled water will thereafter be capable of analysis to show the pH factor. To prevent contamination of the distilled water, deposit of the soil can most effectively be done in the distilled water container.

A second element used in a soil testing kit is a sensitized paper or test strip, the color of which is changed upon being treated with the distilled water, after that water has been subjected to the soil to be tested. This paper must be maintained completely out of contact with the atmosphere, and in addition, must be maintained against abrasion and wrinkling, so that when the test paper has been colored by the water to show the pH factor, it will be quite simple to compare that color with a suitable pH factor color chart.

As one feature of my invention, I arrange to place the distilled water in one envelope, and the sensitized paper or test strip in a second envelope, the envelopes to be secured to a backing member, that may take the form of the backing of a matchbook type of package.

As a particular feature the matchbook is formed to protect the envelopes. The envelope that contains the distilled water is formed as a thin, preferably rectangular body, fabricated from sheet material of transparent heat sealing plastic. As a particular feature of this part of my invention, the envelope is formed by the heat sealing of thin pliant plastic sheet material. The heat sealing is of a novel character in that it forms an envelope with relatively wide heat sealed margins, that preferably are corrugated. I have found that by fabricating the envelope in this manner, the heat sealed margins will give stiffness and rigidity to the envelope so that it will function not only as a container for the distilled water, but will also function as a container within which the soil to be tested may be inserted and mixed with the water. As those skilled in the art will appreciate, the usual heat sealed envelope of the particular class will be extremely pliable, and will not hold a particular shape. Therefore, when a heat sealed envelope of this class is opened for the insertion of soil, it will not function properly, as there will be no way in which to hold it in position. Those skilled in the art appreciate also that only distilled water may be used, and this water must be in contact only with the soil to be tested prior to application to the test paper.

As a further particular feature of my invention, one of the heat sealed margins of the distilled water envelope is particularly wide, and this margin forms the lower portion or the base of the water-containing envelope through which the envelope may be held in the usual base fold of a matchbook package. Moreover, the extreme rigidity contributed by the base and the two sides of the envelope will hold the envelope substantially vertical for the cutting of its upper edge to render the distilled water available for the insertion of the soil to be mixed with the water.

As a further feature of the invention, the envelope containing the sensitized paper is formed through the use of a pair of extremely thin sheets of polyethylene which are heat sealed and thereafter function to protect the paper. However, this polyethylene is extremely thin and will not have sufficient stiffness to protect the test paper and to prevent its wrinkling. As those skilled in the art appreciate, a wrinkled test strip cannot effectively be compared to a color chart as is required. Therefore, I adhere to at least one of the thin sheets of polyethylene, a further relatively rigid plastic sheet, preferably cellophane, that contributes desired stiffness to the envelope containing the sensitized paper. Further, the second envelope when positioned with one edge in the base fold of the matchbook, is then in a position to add further to the rigidity of the water-containing envelope and to hold the water-containing envelope in position for the mixing of the soil therein. As already indicated, the water-containing envelope is substantially non-collapsible so that it can function as a container, without the presence of the second envelope, but the presence of the second envelope is of some value as those skilled in the art will appreciate.

A third element of the kit is a small color chart. This chart may be packed loosely in the kit or it may be sealed in the envelope with the test paper. There it will be available for comparison with the test paper when the test paper has been contacted by the distilled water after its subjection to mixture with the soil.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention in order to prevent the appropriation of my invention by those skilled in the art.

Referring now to the drawings, FIG. 1 is an isometric view of the package or kit of my invention. FIG. 2 is a vertical cross-section of FIG. 1 along line 2—2. FIG. 3 is an elevation of the envelope containing the distilled water. FIG. 4 is an enlarged section similar to FIG. 2 but showing the water envelope open at its upper edge and with the flap of the matchbook cut away to show the use of the water envelope as a mixing container. FIG. 5 is an elevation showing the envelope for the test strip and color chart. FIG. 6 is a cross sectional exploded view of the parts of FIG. 5 taken along line 6—6.

Referring now more particularly to the drawings, reference numeral 10 indicates generally a matchbook type of package having what I term a backing member 11 (which may be cardboard), a bottom fold 12 and a forward flap 13. The bottom fold is formed by the use of a staple 14, this staple functioning also to hold in position the two envelopes that are part of the combination of my invention, all as will be made clear presently. Advertising and instructions may be printed on flap 13 very effectively, and also on backing 11.

The water-containing envelope of my invention may be formed of two small sheets of plastic material or a single small sheet bent over. Through the use of particularly designed heat sealing elements, the peripheral edge of the envelope is formed as well illustrated in FIG. 3. There, the envelope itself is designated by reference numeral 15, and it will be seen that this envelope has a relatively wide vertical heat sealed margin 16 at each side, an upper heat sealed margin 17, and a relatively wider margin 18 at the base. Further, it will be noted that because of the design of the heat sealing elements, the margins are corrugated. This form of heat sealing yields what I term a non-collapsible envelope. Without the margins 16 and 18, the envelope could not possibly be maintained against collapse, as the material of which it is formed is very thin and pliant.

Distilled water is packaged within the envelope 15, and this envelope is assembled into the fold 12 of the matchbook through utilization of the staple 14 passing through the wide heat sealed corrugated margin 18. In FIG. 4 I have shown the matchbook in open position with the backing member 11 vertical, it being obvious that it may so be held manually. In FIG. 4 I show also the upper margin 17 of the envelope cut away so that the envelope is open with the water therein as noted. Because the envelope is held against collapse, by the heat sealed margins and the backing member 11, soil to be tested may now be dropped into the water and mixed therein effectively. The test paper may now be removed from its envelope 24 and inserted into the water envelope 15. The test paper then may be compared with a suitable pH color chart.

The water-containing envelope 15 is well protected in the matchbook package as may be seen in FIG. 2. Thus, the water containing portion of the envelope, because of the use of the wide heat sealed margin 18, is considerably displaced from staple 14. The backing member 11 and the forward flap 13 form therebetween a chamber, in effect, within which the envelope lies and is, therefor, protected from damage.

The test paper that I utilize is designated by reference numeral 25 in FIGS. 5 and 6. The envelope in which it is packaged is designated by numeral 24. The construction of the envelope 24 is purposely not shown in detail in FIG. 4 so as not to complicate FIG. 4. This paper should be fully protected from moisture vapors and gases as those skilled in the art will appreciate, and for the particular purpose I package the test paper between two thin strips of plastic sheet 26 as best seen in FIG. 6. The plastic sheets are heat sealed to one another so that the test paper is completely shielded against moisture.

Preferably, the plastic sheets forming envelopes 15 and 24 are laminates of heat sealable plastic such as polyethylene sheets 26 to which smooth relatively stiff plastic sheets such as cellophane sheets 27 have been laminated. This stiffens the envelopes 15 and 24, gives them a smoother, glossier appearance and strengthens them against rough handling.

If desired, a pH comparison chart designated by reference numeral 30 may be applied in position between the sheets of polyethylene 26. The comparison chart 30 may remain in position after removal of all or part of the test strip 25, it being obvious that there may be several test strips packaged rather than a single test strip in the event repeated tests on the same soil sample are needed for accuracy and checking or if several liquid envelopes 15 are included in the package. At least the front sheets 26 and 27 should be transparent so that the chart 30 may remain in the envelope 24.

The envelope 24 of FIG. 5, which is formed by the several sheets 26 and 27 is put in position within the fold 12 as illustrated in FIGS. 2, 3 and 4 and there also held by staple 14. Actually, the envelope containing the test paper will further protect the water-containing envelope, and will even assist the heat sealed margins of the water-containing envelope 15 to hold that envelope in a position where it may serve as a mixing container.

It will be understood that other liquid solvents or test solutions may be contained in envelope 15 and that the test paper 25 may be modified accordingly for testing other soil conditions as well as pH.

Furthermore, it will be seen that I have provided a soil testing kit that may be imprinted on the matchbook cover 10, 12, 13 at low cost for small volume production; that protects the test paper 25 from all contaminants; and that may be conveniently used in the field without the aid of any further vessels or solvents.

It will thus be seen that the objects set forth above, among those made apparent from the preceding description, are efficiently attained, and since certain changes may be made in the above product without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A soil testing kit package comprising a backing member whereby the package may be held, thin pliant heat-sealable plastic sheet material heat sealed peripherally to form an envelope containing distilled water, the heat sealing of said envelope at its periphery being such as to form heat sealed margins having very considerable width and stiffness whereby to render said envelope relatively non-collapsible, means for securing said envelope at a peripheral portion to said backing member whereby said envelope will hold a substantially vertical position when said backing member is in a predetermined position, and will thereby function as a mixing container for the purpose described when opened at its upper periphery for insertion of soil; said backing member being formed of cardboard to which the lower heat sealed margin of the envelope is secured by said securing means; and a test paper enclosed between sheets of relatively stiff transparent material to form a relatively rigid envelope secured at its bottom to said backing member by said securing means in a position placing the water-containing envelope between it and the backing member to assist said heat sealed margins of said water-containing envelope in holding said envelope in a substantially vertical position when said backing member is vertically disposed.

2. In the combination of claim 1, the feature that a color chart is held by said transparent material in position to remain effective after said test paper is removed, whereby said chart may be compared with said test paper after said paper is subjected to said water.

3. A soil testing kit package comprising a backing member whereby the package may be held, thin pliant heat sealable plastic sheet material heat sealed peripherally to form an envelope containing distilled water, the heat sealing of said envelope at its periphery being such as to form heat sealed margins having very considerable width and stiffness whereby to render said envelope relatively non-collapsible; means for securing said envelope at a peripheral portion to said backing member whereby said envelope will hold a substantially vertical position when said backing member is in a predetermined position, and will thereby function as a mixing container for the purpose described when opened at its upper periphery for insertion of soil; and a test paper held in a second envelope formed of thin heat sealed plastic sheets, a relatively stiff plastic sheet backing at least one of said heat sealed plastic sheets of said second envelope to stiffen said second envelope and thereby protect the test paper against wrinkling and the like, and said securing means securing said second envelope relatively to said first envelope and backing member.

4. In the combination of claim 3, the feature that said backing member is part of a matchbook type holder having a forward flap integral with said backing member and folded over said envelope into coaction with a base fold of said backing member, said flap forming with said backing member a protective chamber, in effect, for said water-containing envelope.

5. In the combination of claim 3, the feature that the heat sealing of said envelope is such as to contribute relatively wide corrugated margins, the lowermost of which when the envelope is held vertically, is wider than the others whereby a staple may be driven therethrough and said backing member to assemble the envelope to said backing member.

6. A soil testing kit package in the form of a folding matchbook of the type having a backing member with a bottom fold together with a forward flap integral with said backing member and adapted to slide into said bottom fold, and including an envelope containing water and an envelope containing a test paper, and means securing both of said evelopes with one of their peripheral margins in said fold, said forward flap being so dimensioned that when it is entered into said fold, it forms with said backing member a protective chamber for said envelopes; said liquid-containing envelope being sufficiently rigid to function as a mixing container for the purpose described through the heat sealing thereof in a manner to present relatively wide and stiff heat sealed margins, the lower of which is secured in said fold, the portion of said envelope containing the water being in said protective chamber; and said test paper envelope being relatively rigid and assembled in the bottom fold outwardly relative to the water-containing envelope so as to assist said peripheral margins in holding said water-containing envelope in a vertical position when said backing member is vertically disposed, and to protect said water-containing envelope.

References Cited

UNITED STATES PATENTS

| | | | |
|---|---|---|---|
| 1,967,557 | 7/1934 | John | 23—253(TP) |
| 2,658,613 | 11/1953 | Volckening | 206—47X |
| 2,923,404 | 2/1960 | Adell | 206—56($A^2$) |
| 3,076,541 | 2/1963 | Volckening | 206—47 |
| 3,129,815 | 4/1964 | Baxter | 206—56($A^2$) |
| 3,164,695 | 1/1965 | Sanni | 206—56($A^2$) |

MORRIS O. WOLK, Primary Examiner

B. S. RICHMAN, Assistant Examiner

U.S. Cl. X.R.

116—114; 206—47